United States Patent [19]

Playe

[11] Patent Number: 4,636,816

[45] Date of Patent: Jan. 13, 1987

[54] ELECTROSTATIC PRINT HEAD

[75] Inventor: Patrice Playe, Houilles, France

[73] Assignee: Compagnie Industrielle des Telecommunications Cit-Alcatel, France

[21] Appl. No.: 607,039

[22] Filed: May 4, 1984

[30] Foreign Application Priority Data

May 9, 1983 [FR] France ................................ 83 07685

[51] Int. Cl.⁴ ............................................ G01D 15/06

[52] U.S. Cl. ................................ 346/155; 346/153.1; 346/154

[58] Field of Search .................... 346/139 C, 154, 155, 346/153.1, 162, 163

[56] References Cited

U.S. PATENT DOCUMENTS

| | | | |
|---|---|---|---|
| 3,653,065 | 3/1972 | Brown, Jr. | 358/300 X |
| 4,054,885 | 10/1977 | Rothgordt | 346/154 |
| 4,183,032 | 1/1980 | Ohbori et al. . | |
| 4,271,417 | 6/1981 | Blumenthal et al. . | |
| 4,315,270 | 2/1982 | Lloyd et al. | 346/155 |

FOREIGN PATENT DOCUMENTS

| | | |
|---|---|---|
| 0000070 | 12/1978 | European Pat. Off. . |
| 0000069 | 12/1978 | European Pat. Off. . |
| 2838241 | 3/1979 | Fed. Rep. of Germany . |

*Primary Examiner*—E. A. Goldberg
*Assistant Examiner*—Linda M. Peco
*Attorney, Agent, or Firm*—Sughrue, Mion, Zinn, Macpeak, and Seas

[57] ABSTRACT

A print head for direct or indirect electrostatic printing comprises at least one row (21) of electrodes disposed at a regular pitch and organized in n groups ($G_1 \ldots G_n$) per row, together with a counter-electrode (1) constituted of a resistive material extending opposite the electrodes in the row with n+1 conductive tracks defining n resistances in series ($R_1$ to $R_n$) and constituting access connections ($C_1$, $C_{n+1}$) thereto for selecting different groups of electrodes.

8 Claims, 5 Drawing Figures

II
III
1
2
3
4
1'
4'
10
13
14

ELECTROSTATIC PRINT HEAD

The present invention relates to print devices using a plurality of aligned individual electrodes for printing on a recording medium which moves past the electrodes.

It relates more particularly to an electrostatic print head by means of which a latent electrostatic image is progressively created on the recording medium by an ion discharge obtained by raising the electrodes to high tension while the recording medium is moved past the the head.

BACKGROUND OF THE INVENTION

The individual electrodes utilized in an electrostatic print head are very small and large numbers of them are required to give desired resolution on a given length of line. There may be 1728 of them, for example, for printing on an A4 format medium at 8 points per millimeter.

In practical embodiments, in order to avoid applying the high tension required to give an ion discharge for printing an electrostatic image solely to the electrodes, the electrodes are associated with a counter-electrode which is also raised to high tension. Under such conditions, the high tension required for ion discharge is applied to each electrode/counter-electrode pair with the high tension that is applied to the electrode on its own or to the counter-electrode on its own being less than a threshold value for causing ion discharge, and thus being incapable of printing.

In direct electrostatic printing, special paper is used comprising a base of conductive paper covered with a dielectric deposit which is a few microns thick, such paper is called dielectric paper and a latent electrostatic image can be printed directly thereon. The latent image is then inked or developed by means of a magnetic brush or by any other developer means, and the developed image is fixed by pressure or in an oven.

In indirect electrostatic printing, dielectric paper is not used, but an intermediate recording medium is used, such as a dielectric deposit on a drum or simply a thin insulating film (e.g. 10 $\mu$m to 20 $\mu$m thick), and ordinary paper, preferably in sheets, is used as a final medium. The latent electrostatic image is created on the intermediate medium, and then inked by means similar to those used for direct electrostatic printing, and the inked image is then transferred, e.g. by pressure or by corona, to a sheet of ordinary paper whee it is fixed.

In direct electrostatic printing, because of the possibility of conduction through the conducting layer of the dielectric paper used, and to minimize the number of high tension transistors needed to power the electrodes, the electrodes are divided into identical groups, an independent counter-electrode of substantially the same length as a group of electrodes is attributed to each group of electrodes, and electrode power supply demultiplexing is provided by interconnecting all the electrodes occupying the same positions in the various groups. Thus, if the printing high tension has the value V, a voltage of V/2 is applied to the counter-electrode attributed to one of the groups of electrodes while the other counter-electrodes are at a potential of 0 volts, and a "printing" voltage of −V/2 or of 0 volts (depending on whether a mark is to be printed or not) is applied to the electrodes of the various groups with printing being possible only for the electrodes in the group associated with the counter-electrode at V/2. A complete line is thus printed on a recording medium by sequentially powering different position electrodes in as many successive cycles as there are groups of electrodes, and in powering a single respective counter-electrode for each group cycle.

For a print head having 1728 electrodes, an optimal arrangement is defined by having 36 groups of 48 electrodes each, giving a total of 84 power switches.

In commonly used direct electrostatic printing systems, and in particular in high resolution systems, printing problems could be associated with the electrodes opposite the gaps between counter-electrodes where the electric field is of reduced strength in spite of the conductivity of the conductive layer of the dielectric paper. The gaps are 0.1 to 0.5 mm wide. These problems are avoided by disposing each counter-electrode of length substantially equal to the length of a group of electrodes, opposite electrodes belonging to two successive groups. These is thus one more counter-electrode than there are groups of electrodes and the set of counter-electrodes overlaps from both ends of the line of electrodes, In other words each of the end counter-electrodes is disposed opposite to a part only of the corresponding end group of electrodes. The demultiplexing circuit then used interconnects the electrodes in corresponding positions in even numbered groups into a first network and interconnects the electrodes in the same positions in odd numbered groups into a second and independent network. Both networks are connected to as many individual power switches as there are electrodes in a group and each counter-electrode is also connected to an individual power switch. Printing is then performed by applying the printing voltage of −V/2 or 0 volts to the electrodes in successive positions in each network alternately, while at the same time applying the voltage of V/2 simultaneously to the two successive counter-electrodes which are disposed opposite the current group of electrodes, thereby minimizing the side effects due to the gaps between adjacent counter-electrodes.

Further, in high resolution printing systems, problems due to the small electrode pitch are avoided by arranging the electrodes in two identical and independent rows which are offset relative to one another by half the pitch of the electrodes along each row and in which the electrodes are associated by group. The counter-electrodes are then associated with the electrodes of both rows, and overlap on either side of the rows.

In currently used direct electrostatic printing systems, the electrodes and the counter-electrodes associated therewith and in the vicinity thereof, may be disposed either on opposite sides of the dielectric paper, or else on the same side of the dielectric paper opposite the face with the dielectric deposit, with two identical rows of counter-electrodes then being used regardless of whether there are one or two rows of electrodes. The two rows of counter-electrodes are either disposed on either side of a single row of electrodes, or else they are disposed on either side of the set of both rows of electrodes with two facing counter-electrodes always being connected to the same potential.

Indirect electrostatic printing systems use a set or "comb" of electrodes identical or analogous to those used in direct electrostatic printing systems. The electrodes are applied against one face of a dielectric film which constitutes the intermediate recording medium, and a single counter-electrode is applied to the other face of the film opposite the comb of electrodes. The absence of a conductive layer in the intermediate support makes it impossible to associate independent counter-electrodes with the electrodes of the comb, since printing cannot take place between the counter-electrodes, and it is consequently impossible to use a demultiplexer circuit.

Preferred embodiments of invention enable a demultiplexer circuit to be used in an electrostatic print head in such a manner that the head can perform direct or indirect electrostatic printing on a conventional recording medium.

SUMMARY OF THE INVENTION

The present invention thus provides an electrostatic print head comprising at least one row of individual electrodes disposed at a regular pitch and organized in n groups of electrodes per row, the said groups of electrodes being themselves organized successive sets of at least two groups each, and the electrodes which are in the same positions within different groups in the same set being interconnected, the improvement wherein the head further comprises a counter-electrode disposed facing the electrodes over at least the length of said row, and constituted by resistive material having n+1 conductive tracks in contact therewith disposed at regular intervals substantially equal to the pitch of the groups of electrodes along a row, thereby defining n intertrack resistive portions each of which is disposed opposite one of the groups of electrodes and is attributed thereto for selecting that group from the other groups, the said resistive portions forming n electrical resistances which are substantially identical, and connected in series, and for which the said tracks constitute electrical access connections to the end terminals of the two end resistances and to the points between the resistances.

In a preferred embodiment, each of the said conductive tracks is wider than the pitch of the said electrodes along their row.

BRIEF DESCRIPTION OF THE DRAWINGS

Embodiments of the invention are described by way of example with reference to the accompanying drawings, in which.

MORE DETAILED DESCRIPTION

As will appear from the description of FIGS. 1 to 4, a counter-electrode in accordance with the invention for association with a row of electrodes in an electrostatic print head is constituted by resistive material in which a plurality of conductive tracks are implanted in good electrical contact with the resistive material. The conductive tracks are disposed at regular intervals.

Figures 1, 2, 3, 4:
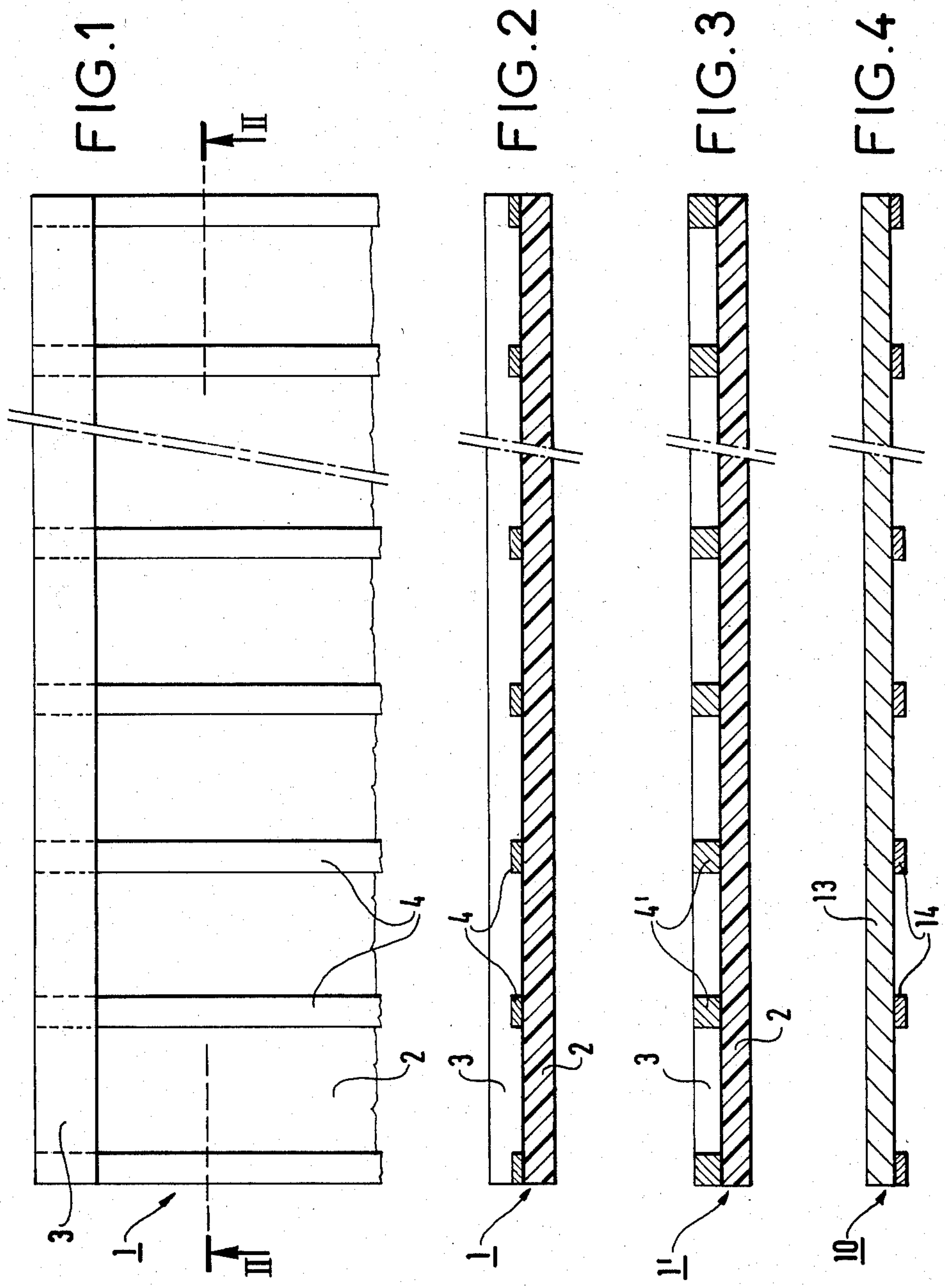
FIG. 1 is a plan view of a counter-electrode in accordance with the invention.
FIG. 2 shows the counter-electrode of FIG. 1 seen in section on a line II—II of FIG. 1.
FIGS. 3 and 4 are sections showing two variant embodiments of a counter-electrode in accordance with the invention.

In FIGS. 1 and 2, the counter-electrode has an overall reference 1. The counter-electrode comprises an insulating substrate 2, such as a rigid or a flexible printed circuit card substrate, with a layer of resistive material 3 disposed on one of its faces close to one of its long edges. The resistive material may be of the kind used for manufacturing resitances in hybrid circuits and which sets at low temperature, and the ends of conductive tracks 4 are embedded in the resistive material at regular intervals, which tracks run across the width of the substrate 2.

The conductive tracks 4 pass right through the resistive layer 3 and are in good contact therewith.

In the embodiment shown in FIGS. 1 and 2, the conductive tracks 4 are not as thick as the resistive layer 3.

In the variant shown in FIG. 3, in which the counter-electrode has an overall reference 1′, the items which are identical to those shown in FIGS. 1 and 2 are designated by the same references. This embodiment differs from the preceding embodiment in that the conductive tracks designated by the reference 4′ are of substantially the same thickness as the resistive layer 3 on the substrate 2, at least where the ends of the tracks are received in the layer.

In the variant shown in FIG. 4, the counter-electrode designated by the overall reference 10 is constituted by a resistive substrate 13 which may be rigid or flexible with conductive tracks 14 on one of its faces. The conductive tracks 14 run across the width of the substrate between its long edges. They are in good electrical contact with the resistive substrate 13, at least over a longitudinal portion of the substrate, along one of its long edges for example, in which portion they are at regular intervals and constitute, together with the substrate, the counter-electrode 10. Outside said portion the conductive tracks 14 may be insulated from the substrate 13 on which they are mounted by means of an insulating layer.

In the embodiments of FIGS. 1 to 4, the substrate on which the counter-electrode is carried or which together with the conductive tracks constitutes the counter-electrode, advantageously provides for the connection of the conductive tracks to a printed circuit card connector (not shown).

In FIGS. 1 to 4, counter-electrodes in accordance with the invention have been shown independently of the respective rows of electrodes with which they would be associated in an electrostatic print head. However, it will be readily understood, in particular on seeing FIG. 5, that in the resulting print head, the resistive material faces the row of electrodes. It will also be understood that the pitch of the conductive tracks in contact with the resistive material is chosen to be substantially equal to the length of each of the groups of electrodes as defined along the row of electrodes with which a particular counter-electrode is associated. In the print head the counter-electrode is thus preferably mounted in such a manner that each portion of resistive material between two conductive tracks is disposed opposite to a group of electrodes, with the conductive tracks being preferably of greater width than the pitch of the electrodes in the row, e.g. 4 to 8 times greater, and being disposed in the print head facing electrodes belonging to two consecutive groups.

A counter-electrode in accordance with the invention can be made using conventional manufacturing techniques. Thus, for example, the conductive tracks may be deposited on the substrate either by printed circuit technology or by silk screen printing, while the resistive material used in the embodiments of FIGS. 1, 2 and 3 may be deposited on the substrate together with the tracks by silk screen printing.

Figure 5:
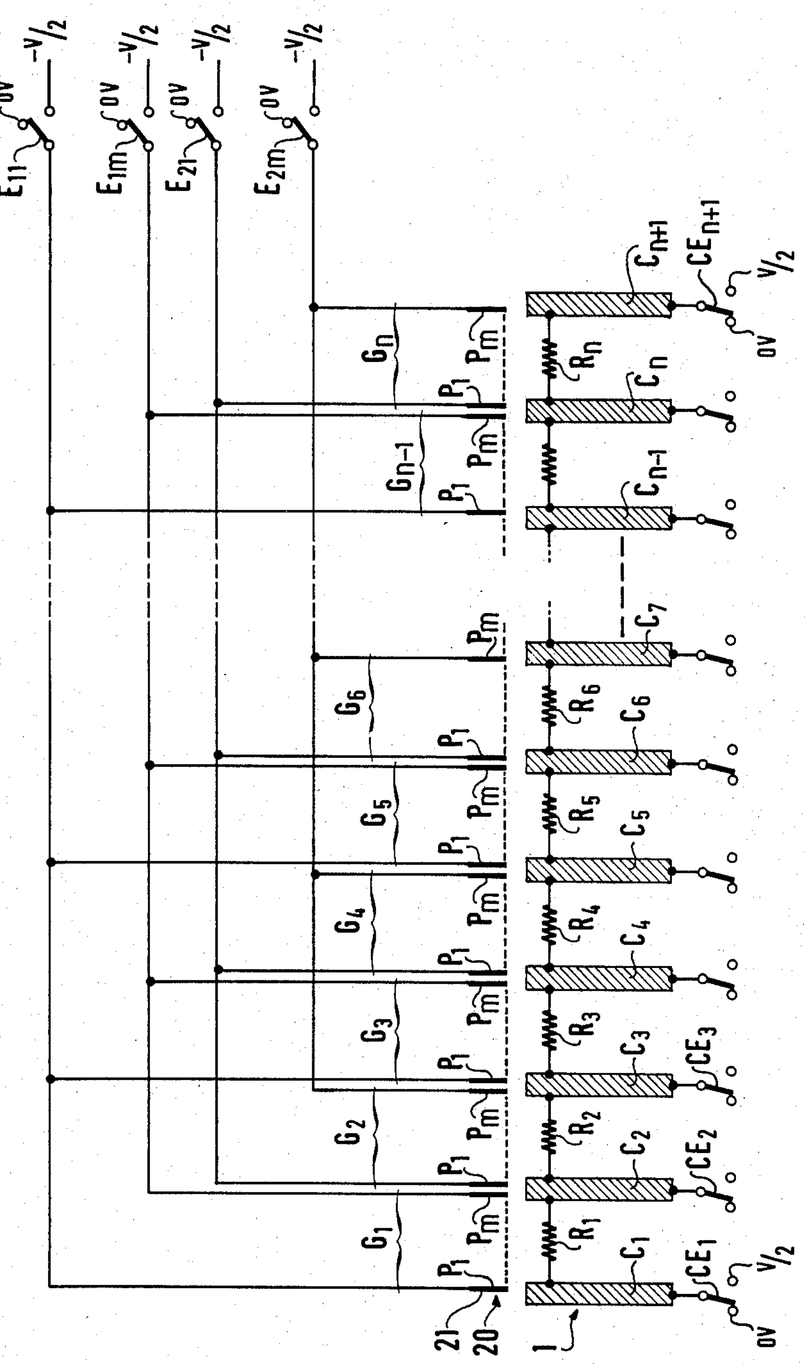
FIG. 5 is the equivalent electrical circuit of an electrostatic print head in accordance with the invention.

FIG. 5 is the equivalent electrical circuit diagram of an electrostatic print head in which a counter-electrode in accordance with the invention, such as the above counter-electrode 1 is associated in the print head with a row of electrodes given the overall reference 20.

In the row 20, the individual electrodes 21 are disposed at regular intervals and are organized in n identical groups of electrodes $G_1$ to $G_n$ in each of which they occupy successive positions $P_1$ to $P_m$. The electrodes in the same positions in the odd numbered groups $G_1$, $G_3$, . . . are interconnected, as are the electrodes in the same positions in the even numbered groups $G_2$, $G_4$, . . . These electrodes in positions $P_1$ to $P_m$ are put to a potential of 0 or V/2 volts by means of a first set of m individual switches $E_{ll}$ to $E_{1m}$ for the odd groups and by means of a second set of m individual switches $E_{21}$ to $E_{2m}$ for the even groups and independent of the switches for the odd groups.

The counter-electrode 1 of resistive material has n+1 regularly disposed conductive tracks and each portion of the counter-electrode lying between two successive tracks is associated with and is placed facing one of the various groups of electrodes.

The n+1 tracks thus define n resistances $R_1$ to $R_n$ between successive tracks and each associated with a specific group of electrodes $G_1$ to $G_n$, and disposed facing the associated group. The counter-electrode thus has a plurality of intermediate connections $C_2$ to $C_n$ and two end connections $C_1$ and $C_{n+l}$ which are connected respectively to the common terminals between two resistances in series and to the two other terminals of the end resistances $R_1$ and $R_n$. These connections $C_1$ to $C_{n+1}$ are connected to V/2 or to 0 volts by means of n'individual switches $CE_1$ to $CE_{n+1}$.

The value of each of the resistances $R_1$ to $R_n$ is chosen to be high, i.e. several megohms, in order to limit current consumption.

Printing operation of the first group of electrodes $G_1$ in the row of electrodes is obtained by switching the potential V/2 to the connections $C_1$ and $C_2$, i.e. to the terminals of the resistance $R_1$, while all the other connections are put to 0 volts. At the same time the print signal of −V/2 or 0 volts depending on whether a dot is to be printed or not is applied successively to the electrodes in positions $P_1$ to $P_m$ of the odd numbered groups while the electrodes of the even numbered groups are kept at 0 volts.

In like manner, the electrodes of the group $G_2$ are caused to operate by connecting only the connections $C_2$ and $C_3$ to V/2, while the print signal is applied in succession to the electrodes in positions $P_1$ to $P_m$ of the even numbered groups with the odd numbered groups being kept at 0 volts.

The entire row of electrodes is caused to print by repeating the procedure. Each group of electrodes is caused to print by successively applying the print signal of −V/2 or 0 volts to the electrodes in positions $P_1$ to $P_m$ in all the odd groups and in all the even groups alternately while keeping all positions in the other parity groups at 0 volts, and at the same time applying the potential of V/2 volts to only those two connections which are on either side of the resistance facing the current group of successive electrodes. Under these conditions the resistances attributed to the various groups of electrodes and their boundary connections serve to select the groups of electrodes which is actually printing at any instant.

In the above example, e.g. concerning printing by the electrodes of the group $G_2$ for which the connections $C_2$ and $C_3$ are put to V/2 volts, the other connections, and in particular the connections $C_1$ and $C_4$ are at 0 volts. This sets up a potential gradient in the resistances $R_1$ and $R_3$, but there is no danger of printing by the groups of electrodes opposite the resistances $R_1$ and $R_3$ since the electrodes in both of these groups are being kept at 0 volts.

FIG. 5 shows only one row of electrodes and one associated counter-electrode. However, it is clear that the print head could have a plurality of rows of electrodes. In particular, the print head could include two rows along each of which the electrodes are arranged in identical odd and even groups. The electrodes of each row are offset relative to the other row by half the pitch of the electrodes along either row, and a single counter-electrode is used, analogous to that illustrated, in associated with both rows of electrodes and located on the other side of a recording medium from the groups of electrodes.

In the arrangement in accordance with the invention of at least one row of electrodes and the associated counter-electrode as described above, the side effects due to the gaps between adjacent counter-electrodes in systems having multiple independent counter-electrodes no longer exist.

The width chosen for the tracks is not critical. However, in practice, in order firstly to take advantages of the mechanical positioning tolerances between the counter-electrode and the row of electrodes, and secondly to make implementing high value resistances $R_1$ to $R_n$ easy, the connections $C_1$ to $C_{n+1}$ (FIG. 5) are preferably constituted by conductive tracks which are considerably wider than the pitch of the electrodes along their row, but which are nonetheless considerably smaller than the pitch of the groups of electrodes. For example a width of 4 to 8 times the electrode pitch, or even greater may be selected. The fact that the tracks are chosen to be of such a width that they overlap adjacent groups of electrodes is of no hinderance in the mode of operation explained above and is used because it facilitates manufacture by permitting slack tolerances. Further, the conductive tracks in the variant shown in FIG. 3 are made even wider because the resistive material used is sensitive to abrasion.

This counter-electrode which enables a demultiplexer circuit to be used for powering individual electrodes can be used with an electrostatic print head for direct or for indirect printing.

The present invention has been described with reference to the accompanying drawings. It is obvious that detail modifications can be made to the embodiments illustrated and/or certain means may be replaced by other, equivalent means, without thereby going beyond the scope of the invention. In particular, it will be observed that known electrode demultiplexing arrangements can be used and the counter-electrode associated with the various defined groups of electrodes can be organized in consequence, thereby enabling electrodes in successive groups of electrodes in the row to be selected.

What is claimed is:

1. An electrostatic print heat comprising at least one row of individual electrodes disposed at a regular pitch and organized in n groups of electrodes per row, the said groups of electrodes being themselves organized in successive sets of at least two groups each, and the electrodes which are in the same positions within different groups in the same set being interconnected, wherein the head further comprises a counter-electrode disposed facing the electrodes over at least the length of said row, and constituted by resistive material having n+1 conductive tracks in contact therewith disposed at regular intervals substantially equat to the pitch of the groups of electrodes along a row, with a predetermined gap between adjacent conductive tracks defining n intertrack resistive portions each of which is disposed opposite one of the groups of electrodes and is attributed thereto for selecting that group from the other groups, with at least one electrode in each group of electrodes being directly opposite each resistive portion, the said resistive portions forming n electrical resistances which are substantially identical, and connected in series, and for which the said tracks constitute electrical access connections to the end terminals of the two end resistances and to the points between the resistances.

2. An electrostatic print head according to claim 1, further including an insulating substrate on which said conductive tracks are formed partially embedded in the said resistive material.

3. An electrostatic print head according to claim 1, comprising a resistive substrate forming said resistive material on which the said conductive tracks are formed in electrical contact with the resistive substrate over at least a transverse portion of the tracks.

4. An electrostatic print head according to claim 1, wherein the said conductive tracks constituting the access connections to the n resistances are each of greater width than the pitch of the electrodes along their row.

5. An electrostatic print head according to claim 4, wherein the said conductive tracks overlap the space between adjacent groups of electrodes and that the end tracks overlap beyond the ends of the end groups.

6. An electrostatic print head according to claim 1, wherein said electrodes in the same positions in the groups are interconnected in one or the other of two networks depending on whether they belong to an odd group or to an even group in their row, and each connected to individual switches belong to two sets of switches, wherein said access connections to the resistances are connected to n'individual switches, the sets of switches connected to the electrodes being controlled by the print signal in alternation while high tension is simultaneously applied only to those two connections which have direct access to the resistances attributed to the group of electrodes being controlled for printing.

7. An electrostatic print head according to claim 1, wherein a plurality of electrodes in each group of electrodes are directly opposite the gap between adjacent conductive tracks.

8. An electrostatic print head according to claim 1, wherein the length of said gap between adjacent conductive tracks is greater than the distance between adjacent electrodes in any of said groups.

* * * * *